Jan. 5, 1926.

M. SCHEY 1,568,535

ADJUSTABLE SPIT

Filed Jan. 13, 1925

INVENTOR.
Max Schey
BY Jas. H. Griffin
ATTORNEYS.

Patented Jan. 5, 1926.

1,568,535

UNITED STATES PATENT OFFICE.

MAX SCHEY, OF BROOKLYN, NEW YORK.

ADJUSTABLE SPIT.

Application filed January 13, 1925. Serial No. 2,068.

*To all whom it may concern:*

Be it known that I, MAX SCHEY, a citizen of the United States, residing in Brooklyn, county of Kings, and State of New York, have invented a certain new and useful Adjustable Spit, of which the following is a specification.

This invention is a spit adapted to be used in the roasting or broiling of meat and poultry.

Spits belong to a very old art and are generally constructed with one or more prongs adapted to be thrust through the meat or poultry in order to support the same in position before or over the source of heat. Spits in order to have sufficient strength to properly support the roast or broil must be made relatively rugged and it has been the practice to form the prongs rather heavy and such prongs could only be forced through the roast with considerable difficulty. Moreover, with some roasts, wherein there are numerous bones, or even one large bone, such, for example, as in a ham, considerable difficulty is encounterd in forcing the prongs through the roast and it is impossible, in many cases, because of the presence of bones to mount the roast in a balanced condition on the spit. As a result all sides of the roast are not uniformly presented to the heat, and, moreover, the operation of the spit is jerky due to the uneven balance, thereby placing uneven loads on the motors or other prime movers and upon the power transmitting mechanism usually employed in roasting apparatus employing spits.

The object of the present invention is to provide a spit adapted to support roasts of widely varying sizes without necessitating the thrusting of prongs through the roasts as heretofore and to also enable such positioning of the roast on the spit that it will be in a substantially balanced condition whereby it can rotate smoothly with all parts uniformly presented to the heat as the contour of the roast will permit.

Speaking generally, the spit of the present invention embodies a pair of alined trunnions for mounting the spit for rotation. These trunnions are spaced apart and with each of them is associated a plurality of relatively short prongs facing toward one another. Spacing rods are employed to maintain the trunnions in spaced relation and one set of prongs is made adjustable longitudinally of the spacing rods, so that a roast positioned between the prongs can be gripped by them by forcing the movable prongs in the direction of the fixed prongs. Suitable locking means is provided for locking the movable prongs in adjusted position after the roast has been properly gripped.

This arrangement permits of the supporting on the spit of roasts of widely varying sizes and the structure which I have outlined may be employed as complete in this. However, in practice, I preferably associated with the spacing rods an adjustable partition element, so that one roast may be supported between the fixed prongs and a set of prongs mounted on one side of the partition element, while an additional roast can be supported by the prongs on the other side of said element acting in conjunction with the adjustable prongs to which I have referred. The employment of the partition element increases the capacity of the spit for small roasts such, for example, as chickens, ducks or other poultry, and while I have specifically referred to the mounting of two roasts through the emplyoment of the partition element, it is found in practice that for roasting small chickens, squabs and the like, several of them can be roasted at one time when the partition element is used.

Features of the invention, other than those adverted to, will be apparent from the hereinafter detailed description and claim, when read in conjunction with the accompanying drawings.

The accompanying drawings illustrate different practical embodiments of the invention, but the constructions therein shown are to be understood as illustrative, only, and not as defining the limits of the invention.

Figure 1:
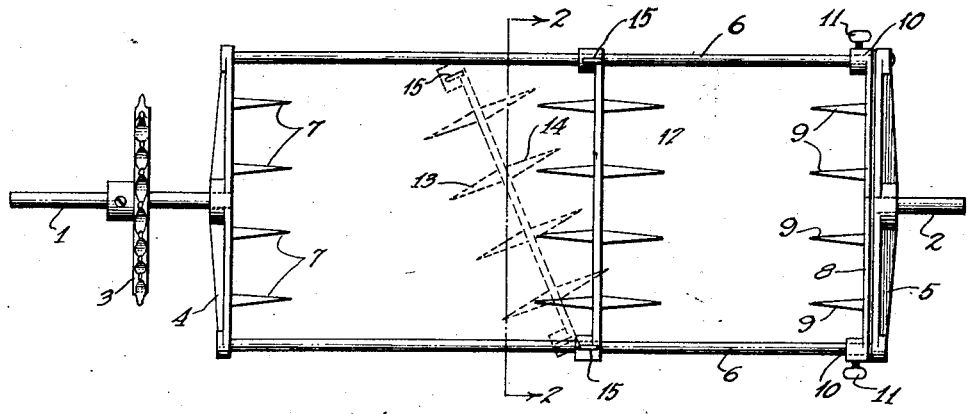
Figure 1 is a side elevation of a spit embodying the present invention.
Figure 2:
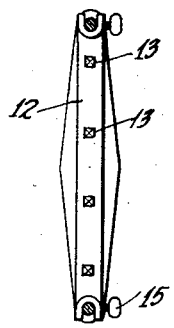
Figure 2 is a section on the line 2—2 of Figure 1.

Referring to the drawings, and more particularly to the structure shown in Figures 1 and 2, 1 and 2 designate stub shafts or trunnions alined with respect to one another and spaced apart. They are adapted to support the spit for rotation and one of them carries a gear or sprocket 3 through which rotation is imparted to the spit. On the adjacent ends of the trunnions are mounted brackets 4 and 5, which, in practice, may conveniently be in the form of castings.

These brackets are shown in Figures 1 and 2 as extending radially in two directions on opposite sides of the respective trunnions to form radial arms. The brackets are spaced apart by spacing rods 6, the opposite ends of which are rigidly secured to the respective brackets, two of these rods of the same length and parallel to one another being employed.

Mounted on the inner face of the bracket 4 are a plurality of fixed prongs 7 of any suitable number, four being shown in the drawings. Mounted to slide on the rod 6 between the brackets is a follower 8, the inner face of which is provided with prongs 9. The follower is provided with bosses 10 through which the rods 6 pass, so as to permit of sliding movement of the follower on the rod to vary the distance between the prongs 7 and 9 and said follower may be locked in any desired position by means of thumb screws 11 which thread through the bosses and bear against the rods.

To mount the roast on a spit of the character described, it is only necessary to loosen the thumb screws 11 and retract the follower a sufficient distance to allow the roast to be placed between the prongs 7 and 9. If the follower is now forced forwardly against the roast, the prongs 7 and 9 will be forced into the opposite ends of the roast so that if the thumb screws 11 are thereupon screwed up tight, the roast will be firmly held in position.

It will be noted that the prongs are relatively short so that they will not unduly mar or cut the roast, but, in contradistinction, will leave it in an unmutilated condition.

In practice, the spits are made relatively long and in using these spits for small roasts, such as fowl, I preferably economize in fuel consumption for any particular roast by providing one or more partition members, one of which is shown at 12. These partition members are in the form of bars, the opposite ends of which are bifurcated, so that they may be brought into cooperation with the spacing rods 6, as shown in dotted lines in Figure 1. Thus by slightly tilting the partition members, they can be brought into cooperative relation with the bars, so as to partake of the full line position of Figure 1, whereupon they can be slid longitudinally of the rods in order to grip roasts of the smaller sizes.

For example, one roast may be positioned between bracket 4 and an adjacent partition and held in place by the prong 7 of the bracket 4 and similar prongs 13 on the under side of the partition 12, while an additional roast may be gripped between the prongs 9 of the follower and the oppositely positioned prongs 14 on the partition, Thumb screws 15 threaded through the bifurcated ends of the partitions bear against the rods 6 and lock the partitions in positions of adjustment. It is to be noted in this connection that the heads of the thumb screws 11 and 14 are shaped to be engaged between the tines of a cooking fork, such as are commonly used by cooks and chefs, so that manipulation of these thumb screws while hot may be thereby readily accomplished without fear of burning the fingers.

Figure 3:
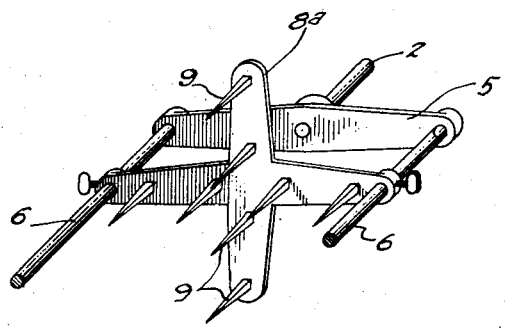
Figure 3 is a perspective detail, showing a modified form of construction.

In the construction shown in Figures 1 and 2, the spit is constructed to lie substantially in a common plane, so that the points of all the prongs lie in said plane. It is within the perview of this invention, however, to form the follower 8$^a$, the partition and the bracket 4 as shown in Figure 3, from which it will be noted that instead of embodying two regularly disposed arms, the follower is provided with four of such arms. This provides a greater number of prongs for the gripping of the roasts and increases the capacity of the construction for supporting small roasts, as well as increasing its gripping strength for heavy roasts. I wish it understood in this connection that any number of gripping arms may be provided without departing from the spirit of this invention, although, in practice, the structure shown in Figure 1 is found to be generally satisfactory for all purposes.

It will be noted that the end brackets 4 and 5 when joined by the spacing rod 6 constitute with said rods a substantially rectangular frame on the ends of which the trunnions are mounted, while on the sides of which the partitions and follower are adapted for sliding movement. This arrangement gives a strong and rigid construction capable of supporting roasts of considerable size and weight without unduly straining the frame.

It will be noted from the foregoing detailed description that the invention is simple in construction, economical to manufacture, and is convenient and efficient in use. The invention marks a pronounced advance in spit construction and is a distinct departure from prior practice wherein the supporting of roasts on a spit has been almost universally practiced by forcing the spit entirely through the roast. The detailed description and drawings showing the invention in its preferred form, but it is to be understood that the invention is fully commensurate with the appended claim.

In the foregoing detailed description, I have referred to the gear or sprocket 3 as mounted on one of the trunnions for the purpose of imparting rotation to the spit. It will be understood, however, that the spit may be rotated either manually or by any suitable mechanical connections and the invention is therefore not to be understood as restricted to the specific showing made in this connection.

Having thus fully described the invention, what I claim as new and desire to secure by Letters Patent is:

In a spit, a frame comprising a pair of brackets and parallel rods rigidly secured at their opposite ends to the brackets for spacing said brackets apart, in combination with trunnions associated with the brackets for mounting the spit for rotation, a plurality of prongs rigid with and carried by one of the brackets and projecting in the direction of the other, a follower mounted to slide on the rods and having prongs extending in the direction of the pronged bracket, whereby a roast may be gripped between the pronged bracket and the follower, a partition slidable on the rods between the follower and the pronged bracket and provided with rigid prongs projecting from both sides thereof to enable roasts to be supported between the pronged bracket and the partition and between the partition and the follower, and means for securing the follower against sliding when the roasts are in place.

In testimony whereof I have signed the foregoing specification.

MAX SCHEY.